UNITED STATES PATENT OFFICE.

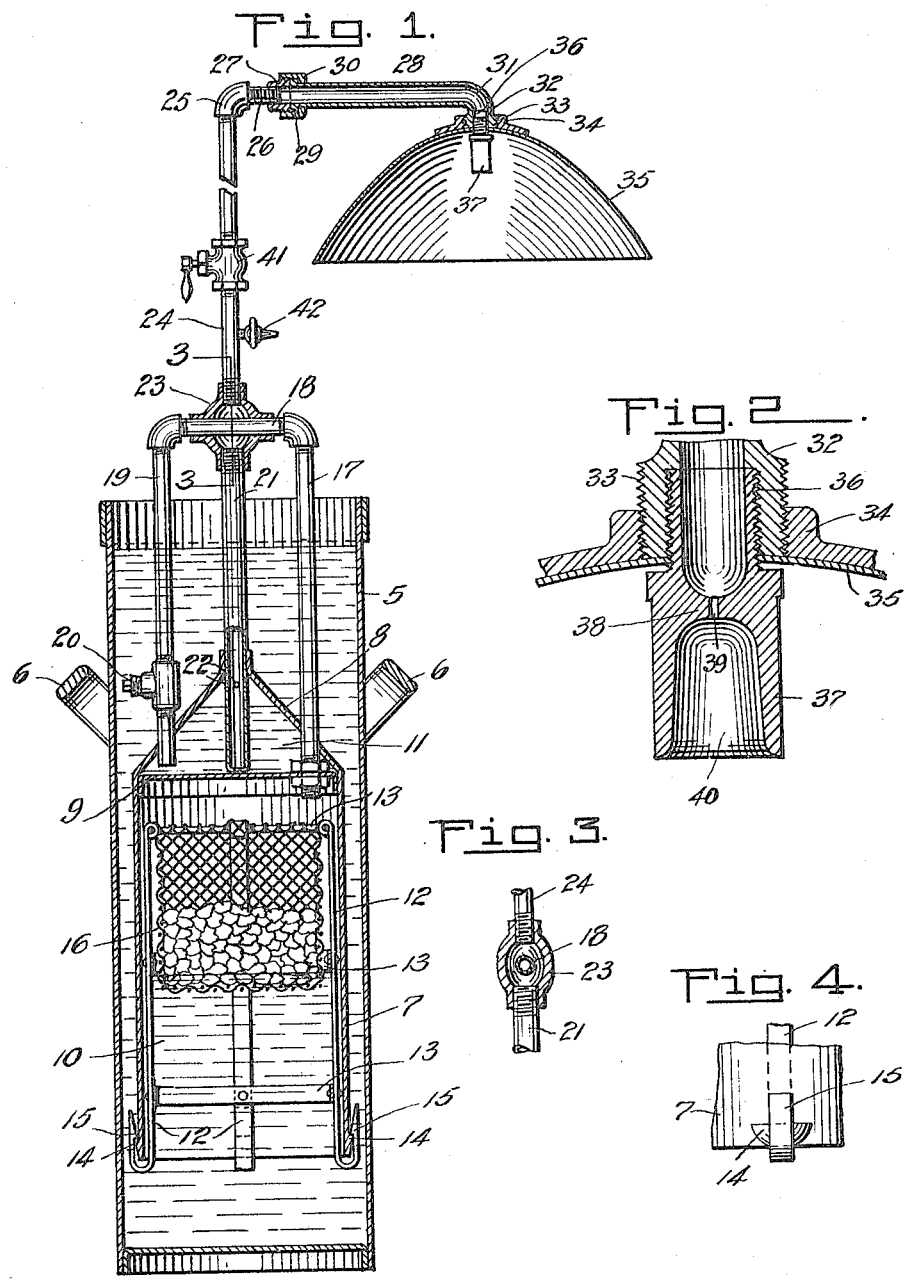

HERMAN C. COPENHAGEN, OF AUBURN, WASHINGTON.

ACETYLENE-GAS GENERATOR.

1,123,691. Specification of Letters Patent. Patented Jan. 5, 1915.

Application filed July 2, 1913. Serial No. 776,918.

*To all whom it may concern:*

Be it known that I, HERMAN C. COPENHAGEN, a citizen of the United States, residing at Auburn, in the county of King and State of Washington, have invented certain new and useful Improvements in Acetylene-Gas Generators, of which the following is a specification.

This invention relates to acetylene gas generators such as are employed by contractors or the like for producing a strong light.

The object is the provision of improvements in devices of this character to render the same more safe, efficient and economical in construction and in the consumption of carbid.

To these ends the invention consists in the novel construction and combination of parts, as will be hereinafter described and claimed.

In the accompanying drawings, Figure 1 is a transverse vertical section of apparatus embodying the present invention. Fig. 2 is an enlarged cross sectional view of the burner with the light-reflector attached. Fig. 3 is a sectional detail view taken through 3—3 of Fig. 1. Fig. 4 is a fragmentary elevational view of the lower end of the generator or gasometer vessel to illustrate the devices for releasably securing thereto the frame which supports the carbid container.

The reference numeral 5 represents an open-top water container or tank desirably of a cylindrical form and provided with handles 6 for convenience in carrying.

7 represents a vessel of less diameter than said tank, open at the bottom, and formed with a top wall 8 which is preferably conical.

9 represents a horizontal partition dividing the vessel 7 into two chambers 10 and 11 which respectively serve as gas generator and washer compartments. Removably secured to the vessel 7 and extending upwardly into the chamber 10 is a skeleton frame comprising upright members 12 and ring members 13 which are rigidly connected together.

The members 12 serve as legs for supporting the frame in upright position when the same is removed from the vessel. For detachably securing the frame to the vessel I provide upon the outside of the latter protuberances such as 14, Fig. 4, which are respectively engaged by hooks 15 provided on upwardly directed lower extremities of the frame members 12. To remove the frame from the vessel the latter is first partially rotated while the frame is supported on the ground to move the protuberances from the hooks, whereupon the vessel may be raised independently of the frame.

Secured by wires or otherwise to the upper ring-member of the frame is a foraminated pan or basket 16 in which the carbid is placed. Said basket is of less depth than the frame and is disposed so that when the frame is inserted in the vessel 7 the bottom of the basket will be above the lower end of the vessel. Extending upwardly from the upper end of the chamber 10 to a distance above the top of the vessel is a pipe 17 having its upper end connected with the end of a horizontal pipe 18 whose other end is connected to a pipe 19 which extends downwardly into the chamber 11 and terminating in proximity to the bottom thereof. These pipes not only serve as a conduit for gas to flow from the chamber 10 into chamber 11 but also as a handle or bail whereby the vessel is most conveniently inserted into or withdrawn from the tank 5, an important function.

In the pipe 19 is an opening which is normally closed by a screw-plug 20 whereby water may be introduced into the chamber 11 for the purpose of cleaning and cooling the gas which passes therethrough.

Connected with the chamber 11 is an upright gas draw-off pipe 21 which is secured to the apex of the conical wall 8 and likewise to the partition 9. The pipe 21 is provided near the top of the chamber 11 with inlet holes 22 and is rigidly connected with a cross-fitting 23 to which is also connected a delivery pipe 24 disposed in axial alinement with the draw-off pipe 21. The before mentioned pipe 18 extends laterally through the cross-fitting and fits tight in the branch outlets thereof so that the various pipes serve to mutually support each other through the medium of the coupling afforded by the cross-fitting. The body or central portion of the cross-fitting is of sufficient size to provide a communication between the pipes 21 and 24 about the interposed pipe 18 as will be understood from an inspection of Fig. 3. Secured to the upper end of the delivery pipe 24 is an elbow 25 which is connected to the end of a nipple 26 whose other end is connected to a screw threaded union element 27.

28 represents the burner-tube having at one end a collar 29 which constitutes the union element complementary to the element 27 to which it is secured in axial alinement by means of the union nut 30. Near its outer end, the burner-tube is formed with a bend 31 and terminates in an arm 32. Said arm is provided with an external screw-thread 33 for engaging with the screw-thread provided interiorly of the attachment 34 provided on a light reflector 35.

Within the end of the arm 32 is a screw-threaded socket 36 to receive the threaded end of a burner-tip 37. This tip is of a substantially tubular form and is provided intermediate its length with a partition 38 which is bored with a relatively small hole 39 which serves as the burner orifice. Said orifice opens into the rear end of a cavity 40 formed in the outer end of the tip and by such an arrangement the flame emitted from the orifice does not become extinguished by winds when the apparatus is employed in exposed situations.

The burner-tip orifice is disposed at a distance in advance of the back of the reflector and the mouth of the tip, as will be noted, protrudes beyond the orifice, whereby such smoke as is produced in the burning of gas is discharged beyond the reflector instead of being deposited on the reflector to render the same ineffective.

41 represents a valve provided in the delivery pipe 24 to regulate the flow of gas therethrough to the burner, and 42 is a pet cock or an equivalent for discharging air from the delivery pipe prior to lighting the burner.

The operation of the invention is as follows: The carbid, desirably in lump form, is supplied to the basket 16, the basket-carrying frame is then inserted in the chamber 10 of vessel 7 and secured to the latter by engaging the hooked arms 12 of the frame to the protuberances 14. The plug 20 is temporarily withdrawn and the chamber 11 nearly filled with water. After replacing said plug, the vessel containing the charge of carbid is placed in the tank 5. Water is then poured into the tank to its brim and about the vessel 7 while the operator prevents the vessel from floating by pushing down upon one of the pipes, as 18. The pet cock 42 is now opened, whereupon the pressure due to the head of water in the tank asserts itself to expel the air from the vessel chamber 10 which is discharged through the medium of the communicating pipes and the pet cock, into the surrounding atmosphere. The water then ascends to replace the air within the chamber 10 and encountering the carbid effects the generation of acetylene gas which is produced under pressure to complete the driving out of the air from the referred to pipes and the part of chamber 11 which is unoccupied by water. When the emission of gas from the pet cock is noticed, the cock 42 is closed and valve 41 opened for the supply of gas for combustion at the burner-tip 37. The operator now discontinues holding down the vessel 7; the latter being thus released will be free to rise or sink in the tank 5 as influenced by the quantity of gas within the vessel; that is to say—when the gas is produced within the chamber 10 in greater quantities than is consumed at the burner, the gas pressure bearing down upon the water lowers the level thereof to below the basket containing the carbid, or the vessel 7 will be raised to elevate the basket containing the carbid above the level of the water in chamber 10, with a consequent interruption in the generation of gas. Should the gas at any moment be consumed at a more rapid rate than produced, the gas pressure within the chamber 10 is reduced and the water is free to ascend into such chamber to again attack the carbid.

From the foregoing, it is apparent that the production of gas is regulated in accordance to the demand and when the valve 41 is shut off the vessel 7 is raised to lift the basket 16 out of the water and the making of gas is thereby stopped. These are important functions, first by affording an approximately uniform supply of gas when the apparatus is in operation, and then stopping the destruction or waste of the carbid which may remain in the basket after the torch has been extinguished by shutting off the valve 41.

The water contained within the chamber 11 has primarily to serve for washing and cooling the gas which passes therethrough. A further office of the water within this chamber is to furnish weight to the vessel, which becomes operative when the upper part of the latter is raised above the surrounding water in the tank and in opposition to the pressure actuated by the gas within the vessel which tends to raise the same.

The gas cooling and washing chamber 11 together with the various pipe connections of the gasometer chamber 10 and the burner, are all connected to move as a single piece, thereby requiring no flexible pipes or movable joints in such connections.

To adjust the reflector into position to direct the light in a vertical plane upon an object, the union nut 30 is loosened and the burner-tube 28 is rotated on its axis and when the axis of the reflector is brought into suitable angular position relative to the horizontal, the burner is secured by the nut.

The directing of the reflector in a horizontal plane is effected by suitably turning the burner, etc., with the vessel 7 about the vertical axis of the latter within the tank or the entire apparatus may be turned.

In practice, the tilting effect due to the burner and the parts supported thereby being to one side of the axis of the vessel, will cause the vessel to lean with sufficient force against the inner periphery of the tank to prevent the vessel being accidentally moved from an adjusted rotary position, as for example, against the influence of winds acting upon the reflector.

The invention is extremely simple, safe and efficient.

What I claim, is—

In apparatus of the class described, a water containing tank, an inverted vessel disposed within said tank, said vessel having upper and lower compartments, an inverted U-shaped pipe having one end opening into the lower compartment and the other end opening into the upper compartment and constituting a means for manually shifting the vessel, a cross-fitting inclosing the bend of the U-shaped pipe, a pipe extending between the upper compartment and the cross-fitting and a gas lead off pipe extending from said fitting to a burner.

Signed at Seattle Wash., this 27th day of June, 1913.

HERMAN C. COPENHAGEN.

Witnesses:
PIERRE BARNES,
E. PETERSON.

Copies of this patent may be obtained for five cents each, by addressing the "Commissioner of Patents, Washington, D. C."